United States Patent
Yajima et al.

(10) Patent No.: US 9,555,858 B2
(45) Date of Patent: Jan. 31, 2017

(54) POWER UNIT AND STRADDLE-TYPE VEHICLE

(71) Applicant: YAMAHA HATSUDOKI KABUSHIKI KAISHA, Iwata-shi (JP)

(72) Inventors: Jun Yajima, Iwata (JP); Takuya Hanano, Iwata (JP)

(73) Assignee: YAMAHA HATSUDOKI KABUSHIKI KAISHA, Iwata-Shi (JP)

( * ) Notice: Subject to any disclaimer, the term of this patent is extended or adjusted under 35 U.S.C. 154(b) by 255 days.

(21) Appl. No.: 14/543,134

(22) Filed: Nov. 17, 2014

(65) Prior Publication Data

US 2016/0137260 A1 May 19, 2016

(30) Foreign Application Priority Data

Nov. 20, 2013 (JP) ................................. 2013-239835

(51) Int. Cl.
B62M 25/02 (2006.01)
G05G 9/06 (2006.01)
B62M 7/02 (2006.01)

(52) U.S. Cl.
CPC ............... *B62M 25/02* (2013.01); *B62M 7/02* (2013.01); *G05G 9/06* (2013.01)

(58) Field of Classification Search
CPC ............ G05G 9/06; B62M 7/02; B62M 25/02
See application file for complete search history.

(56) References Cited

U.S. PATENT DOCUMENTS

| | | | | | |
|---|---|---|---|---|---|
| 3,421,384 | A | * | 1/1969 | Yoshinori | F16H 63/14 74/337.5 |
| 5,411,448 | A | * | 5/1995 | Horii | B62M 9/12 477/102 |
| 6,308,797 | B1 | * | 10/2001 | Hacker | B62M 25/06 180/230 |
| 7,677,124 | B2 | * | 3/2010 | Honma | F16H 63/14 192/46 |

FOREIGN PATENT DOCUMENTS

| | | |
|---|---|---|
| EP | 1 403 559 A2 | 3/2004 |
| EP | 2017504 A1 | 1/2009 |
| GB | 2359119 A | 8/2001 |
| JP | 2004-116545 A | 4/2004 |

OTHER PUBLICATIONS

Extended European Search Report dated Mar. 16, 2015.

\* cited by examiner

*Primary Examiner* — Terence Boes
(74) *Attorney, Agent, or Firm* — Rabin & Berdo, P.C.

(57) ABSTRACT

A power unit includes: a rotation plate 62 that is fixed to an end of a shift drum 50, includes a plurality of recessed portions 63, and rotates together with the shift drum 50; a shift lever 66 that engages with the rotation plate 62; a shift shaft 74 fixed to the shift lever 66; a support shaft 76 disposed substantially in parallel with the shift drum 50; a stopper lever 78 rotatably supported by the support shaft 76; and a stopper roller 88 that is provided in the stopper lever 78 and engages with the recessed portion 63 of the rotation plate 62. When viewed in an axial direction of the shift shaft 74, the stopper lever 78 is disposed to intersect a first line segment A that connects a center 74C of the shift shaft 74 and a center 62C of the rotation plate 62 to each other.

15 Claims, 15 Drawing Sheets

POWER UNIT AND STRADDLE-TYPE VEHICLE

CROSS-REFERENCE TO RELATED APPLICATIONS

This application claims priority to Patent Application No. 2013-239835 filed in Japan on Nov. 20, 2013, the entire contents of which are hereby incorporated by reference.

TECHNICAL FIELD

The present invention relates to power units and straddle-type vehicles.

BACKGROUND ART

A "shift drum type" transmission is often conventionally used in a straddle-type vehicle, for example. A shift drum type transmission includes a plurality of first gears provided on a main shaft, and a plurality of second gears provided on a drive shaft. The first and second gears include movable gears that are movable axially. The shift drum type transmission further includes a shift fork that axially moves the movable gears, and a shift drum provided with a groove with which the shift fork engages. The shift drum is connected to a shift shaft via a gear change mechanism. Upon rotation of the shift shaft, the shift drum rotates. Upon rotation of the shift drum, the shift fork moves along the groove. With the movement of the shift fork, the movable gears move axially. As a result, a combination of the first and second gears, which intermesh with each other and to which a torque is transmitted, is changed, thus changing a transmission gear ratio between the main shaft and the drive shaft.

The gear change mechanism includes a shift lever fixed to the shift shaft, and a rotation plate fixed to an end of the shift drum. The shift lever is arranged to be engageable with the rotation plate. Upon rotation of the shift lever with the rotation of the shift shaft, the rotation plate receives a force from the shift lever and thus rotates. The shift drum rotates with the rotation of the rotation plate. As a result, a speed change is performed.

The gear change mechanism further includes a stopper lever that holds the rotation plate at a suitable position. The stopper lever is rotatably supported by a support shaft. The stopper lever is provided with a stopper roller. An outer peripheral surface of the rotation plate is provided with a plurality of recessed portions. The stopper roller engages with the recessed portion, thus restricting rotation of the rotation plate from the suitable position and holding the rotation plate at the suitable position.

In order to restrict the rotation of the rotation plate, the stopper roller has to be pressed against the recessed portion. As a member that applies a force to press the stopper roller against the recessed portion, JP 2004-116545 A discloses a torsion spring attached to a support shaft for a stopper lever. The torsion spring is wound around the support shaft. Therefore, the torsion spring does not largely protrude around the support shaft. A gear change mechanism including such a torsion spring is advantageous in that the gear change mechanism is easily reduced in size.

SUMMARY OF INVENTION

Technical Problem

However, since the torsion spring is wound around the support shaft, a frictional force is generated between the torsion spring and the support shaft and/or stopper lever during rotation of the stopper lever. The frictional force acts as resistance during rotation of the stopper lever. Hence, the frictional force is a factor that prevents smooth rotation of the stopper lever when a speed change is performed.

Accordingly, embodiments of the present invention provide a power unit that enables smooth rotation of a stopper lever when a speed change is performed, while preventing an increase in size of a gear change mechanism.

Solution to Problem

A power unit according to an embodiment of the present invention includes: a main shaft having a plurality of first gears including a first movable gear that is movable around an axis of the main shaft; a drive shaft having a plurality of second gears including a second movable gear that is movable around an axis of the main shaft, the second gears being configured to intermesh with the first gears; a shift fork configured to engage with the first and second movable gears; a shift drum having a groove with which the shift fork engages; a crankcase housing the main shaft, the drive shaft, the shift fork and the shift drum; a rotation plate fixed to an end of the shift drum, to thereby rotate with the shift drum, the rotation plate including an outer peripheral surface having a plurality of recessed portions; a shift lever configured to engage with the rotation plate; a shift shaft fixed to the shift lever; a support shaft disposed substantially in parallel with the shift drum; a stopper lever, including a first end portion and a second end portion that is rotatably supported by the support shaft; a stopper roller disposed between the first and second end portions of the stopper lever, and being configured to engage with one of the recessed portions of the rotation plate; and an elastic member including a first engagement end portion that is configured to engage with the first end portion of the stopper lever, and a second engagement end portion that is configured to engage with the crankcase, so as to apply a force to the stopper lever to thereby press the stopper roller against the one recessed portion. The stopper lever is so disposed as to, when viewed in an axial direction of the shift shaft, intersect a first line segment that connects a center of the shift shaft and a center of the rotation plate.

In the power unit according to the embodiment of the present invention, the elastic member that applies a force to the stopper lever is attached to the first end portion of the stopper lever, which means that the elastic member is not attached to the support shaft that supports the stopper lever. Thus, the elastic member that applies a force to the stopper lever is not provided on the support shaft, and therefore, a frictional force is prevented from being generated between the elastic member and the support shaft and/or stopper lever. Hence, the stopper lever is smoothly rotated when a speed change is performed. The second end portion of the stopper lever is rotatably supported by the support shaft, and therefore, the stopper lever is rotated around its second end portion. The stopper roller is disposed between the first and second end portions, so that a distance between the first and second end portions is longer than a distance between the stopper roller and the second end portion. The elastic member applies a force to the first end portion of the stopper lever, and therefore, the stopper roller located between the first and second end portions is pressed against the recessed portion of the rotation plate with a force equal to or greater than the force applied from the elastic member. Hence, the force applied from the elastic member is reduced. In other words, the elastic member is reduced in size. When a distance between the center of the shift shaft and the center of the rotation plate, i.e., a length of the first line segment, is short, an angle of rotation of the shift shaft which is necessary to rotate the rotation plate at a given angle is disadvantageously increased. In view of this, a certain distance is ensured between the center of the shift shaft and the center of the rotation plate so that the angle of rotation of the shift shaft is small. According to the embodiment of the present invention, a portion of the stopper lever is disposed between the shift shaft and the rotation plate. Thus, a space between the shift shaft and the rotation plate is effectively utilized to compactly dispose the stopper lever.

According to another embodiment of the present invention, the elastic member preferably is a tension spring.

Thus, a structure of the spring is more simplified than when a compression spring is used.

According to still another embodiment of the present invention, when viewed in the axial direction of the shift shaft with the stopper roller engaging with the one recessed portion of the rotation plate, the stopper roller is preferably disposed on the first line segment, and a second line segment, which connects a center of the support shaft to a connection between the first end portion of the stopper lever and the first engagement end portion of the elastic member, is separate from the rotation plate.

Each of these members is disposed so that the second line segment, which connects the connection and the center of the support shaft to each other, is separate from the rotation plate as just described, and thus the stopper lever does not move along a periphery of the rotation plate. As a result, layout flexibility of the elastic member is increased. Furthermore, since the stopper roller is disposed on the first line segment, the spacing between the shift shaft and the rotation plate is effectively utilized, thus compactly disposing the stopper roller.

According to yet another embodiment of the present invention, the power unit preferably further includes a torsion spring attached to the shift shaft. The torsion spring and the stopper lever are preferably deviated from each other in the axial direction of the shift shaft. A portion of the shift shaft that is located between the torsion spring and the stopper lever is preferably provided with a stopper that restricts axial movement of the torsion spring.

Thus, the torsion spring and the stopper lever are disposed so as to be adjacent to each other in the axial direction of the shift shaft, with the stopper disposed between the torsion spring and the stopper lever. The stopper restricts the axial movement of the torsion spring. As a result, interference between the stopper lever and the torsion spring is prevented reliably.

According to still yet another embodiment of the present invention, the torsion spring preferably includes a first arm portion and a second arm portion adjacent to each other, with the shift shaft interposed therebetween. The support shaft is preferably disposed between the first and second arm portions of the torsion spring.

Upon rotation of the shift lever, movement of one of the first and second arm portions of the torsion spring is restricted by the support shaft. Thus, the support shaft also serves as a stopper shaft that restricts movement of the torsion spring. Therefore, the support shaft and the stopper shaft do not have to be provided separately. As a result, the number of components is reduced, and a gear change mechanism is made compact in size.

According to another embodiment of the present invention, the power unit preferably includes a torsion spring attached to the shift shaft, the torsion spring including first and second arm portions adjacent to each other, with the shift shaft interposed therebetween. The shift lever preferably includes a protrusion located between the first and second arm portions of the torsion spring and engageable with the first and second arm portions of the torsion spring. The support shaft is preferably disposed between the first and second arm portions of the torsion spring.

Upon rotation of the shift lever, one of the first and second arm portions of the torsion spring is pushed by the protrusion of the shift lever, while movement of the other one of the first and second arm portions is restricted by the support shaft, and therefore, the torsion spring expands. The shift lever receives an elastic force from the torsion spring and thus automatically returns to its original position. The support shaft also serves as the stopper shaft that restricts movement of the torsion spring. Thus, the support shaft and the stopper shaft do not have to be provided separately, so that the number of components is reduced and the gear change mechanism is made compact in size. In the above embodiment of the present invention, the stopper lever is disposed to intersect the first line segment, and therefore, the stopper lever protrudes on both sides of the first line segment. However, since the support shaft and the stopper shaft do not have to be provided separately, the gear change mechanism is made compact in size even though the stopper lever protrudes on both sides of the first line segment.

According to still another embodiment of the present invention, when viewed in the axial direction of the shift shaft, a center of the stopper roller is preferably disposed between the center of the rotation plate and a second line segment that connects a center of the support shaft to a connection between the first end portion of the stopper lever and the first engagement end portion of the elastic member.

Thus, an angle formed between a line that extends along an axis of the elastic member and the second line segment that connects the connection and the center of the support shaft to each other is set closer to 90 degrees or set to 90 degrees. Therefore, the elastic member efficiently applies a force to the stopper lever. In other words, it is unnecessary for the elastic member to apply a large force to the stopper lever. As a result, the elastic member is reduced in size and weight. Consequently, the gear change mechanism including components such as the elastic member, the stopper lever and the shift lever is made compact in size.

According to yet another embodiment of the present invention, when viewed in the axial direction of the shift shaft, the stopper roller is preferably disposed on a second line segment that connects a center of the support shaft to a connection between the first end portion of the stopper lever and the first engagement end portion of the elastic member.

The stopper lever has a linear shape, and therefore, the stopper lever is reduced in size and weight. As a result, the gear change mechanism is made compact in size.

According to still yet another embodiment of the present invention, when viewed in the axial direction of the shift shaft, an angle formed between a third line segment and a fourth line segment is preferably 90 degrees or less, the third line segment connecting a first point, which is a point of intersection of a first line that extends along an axis of the elastic member and a second line that passes through the center of the shift shaft and a center of the support shaft to a connection between the first end portion of the stopper lever and the first engagement end portion of the elastic member, the fourth line segment connecting the first point to the center of the support shaft.

Thus, at least a portion of the elastic member is disposed within a range of 90 degrees or less formed between: the fourth line segment that connects the first point and the center of the support shaft to each other; and the third line segment that connects the connection and the first point to each other. As a result, the gear change mechanism is made compact in size.

According to another embodiment of the present invention, when viewed in the axial direction of the shift shaft, an angle formed between a fifth line segment and the first line segment is preferably equal to or smaller than an angle formed between the first line segment and a second line that passes through the center of the shift shaft and a center of the support shaft, the fifth line segment connecting the center of the shift shaft to a connection between the first end portion of the stopper lever and the first engagement end portion of the elastic member.

The connection is located close to the first line segment that connects the center of the shift shaft and the center of the rotation plate to each other. When the first line segment that connects the center of the shift shaft and the center of the rotation plate to each other is defined as a reference line segment, the fifth line segment that connects the center of the shift shaft and the connection to each other is closer to the reference line segment than the second line that passes through the center of the shift shaft and the center of the support shaft. Thus, the elastic member is disposed close to the shift lever, and as a result, the gear change mechanism is made compact in size.

According to still another embodiment of the present invention, when viewed in the axial direction of the shift shaft, a distance between the center of the shift shaft and a connection between the first end portion of the stopper lever and the first engagement end portion of the elastic member is preferably shorter than a distance between the center of the shift shaft and the center of the rotation plate.

The connection is located close to the shift shaft. Thus, the elastic member is disposed close to the shift shaft, and therefore, the gear change mechanism is made compact in size.

According to yet another embodiment of the present invention, the crankcase preferably includes: a wall located between the main shaft and the elastic member and between the drive shaft and the elastic member; and a boss that extends from the wall in a direction substantially perpendicular to an axial direction of the elastic member and with which the second engagement end portion of the elastic member engages. The wall and the boss are preferably cast in one piece.

The boss, which engages with the second engagement end portion of the elastic member, and the wall are cast in one piece, and therefore, the power unit is manufactured at a lower cost. The wall and the boss are integral with each other, thus reducing the number of components.

According to still yet another embodiment of the present invention, when viewed in an axial direction of the main shaft, the boss is preferably disposed to overlap the main shaft, the first gears, the drive shaft, or the second gears.

For example, when a pin that engages with the second engagement end portion of the elastic member is press-fitted to the wall of the crankcase, an insertion length for the pin has to be ensured. Therefore, in that case, a boss that protrudes toward the main shaft, the first gears, the drive shaft or the second gears has to be provided on the wall of the crankcase. Hence, the main shaft, the first gears, the drive shaft and the second gears cannot be disposed close to the wall. However, when the boss that is cast together with the wall and thus integral with the wall is provided, no pin has to be press-fitted to the wall, thus allowing the main shaft, the first gears, the drive shaft and the second gears to be disposed close to the wall.

According to another embodiment of the present invention, the center of the rotation plate is preferably located lower than a center of the main shaft and a center of the drive shaft. The center of the shift shaft is preferably located lower than the center of the rotation plate.

Thus, the shift shaft is disposed at a low position. As a result, when a shift pedal is connected to the shift shaft via a link mechanism, the link mechanism is reduced in length.

A straddle-type vehicle according to an embodiment of the present invention includes the above-described power unit.

According to the embodiment of the present invention, a straddle-type vehicle that achieves the above-described effects is obtained.

Advantageous Effects of Invention

Various embodiments of the present invention provide a power unit that enables smooth rotation of a stopper lever when a speed change is performed, while preventing an increase in size of a gear change mechanism.

DESCRIPTION OF EMBODIMENTS

First Embodiment

Figure 1:
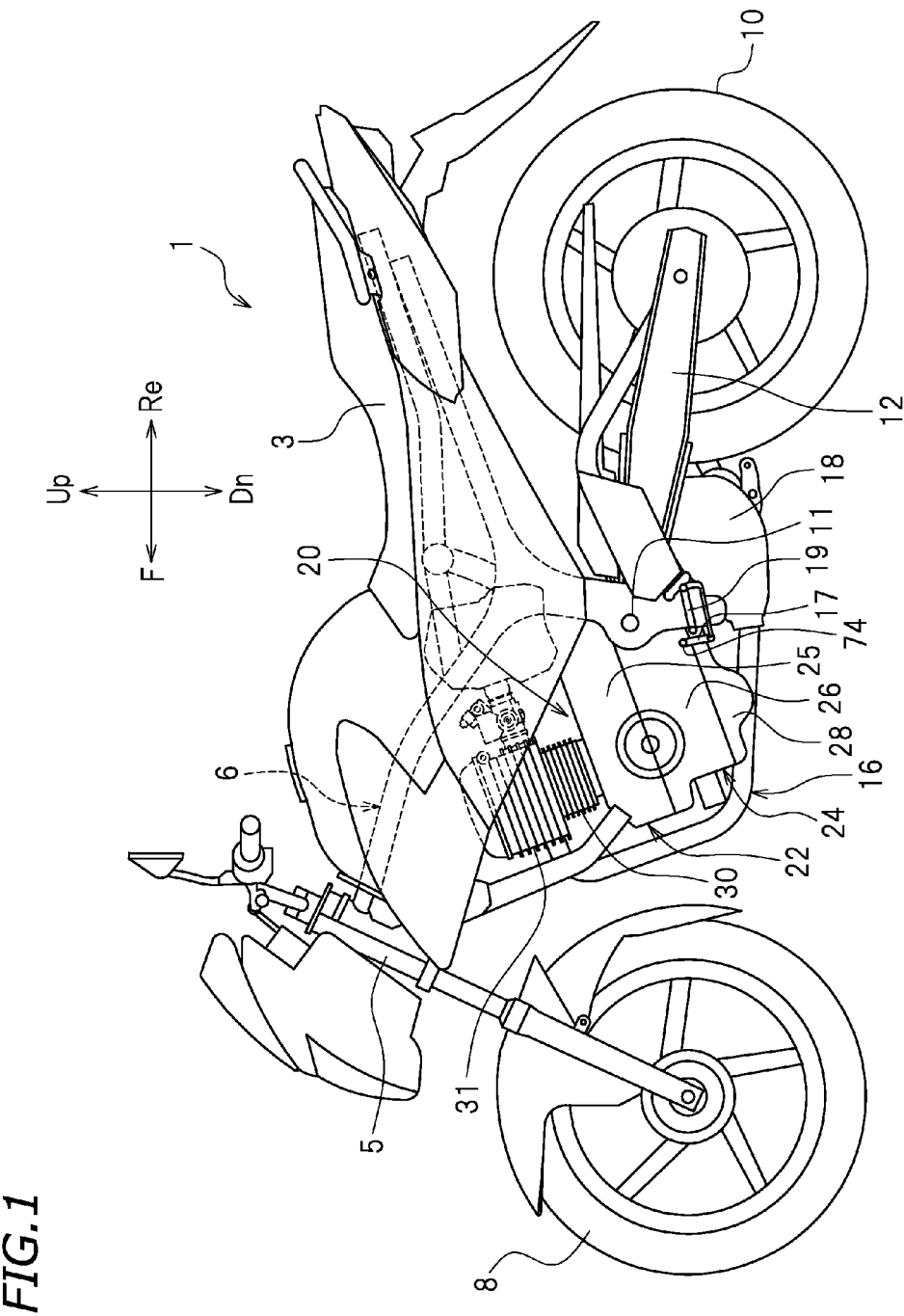
FIG. 1 is a left side view illustrating a motorcycle according to a first embodiment of the present invention.

Hereinafter, embodiments of the present invention will be described. As illustrated in FIG. 1, a straddle-type vehicle according to the present embodiment is a motorcycle 1. The motorcycle 1 is not limited to any particular type of motorcycle, but may be any type of motorcycle such as a "scooter-type", "moped-type", "off-road" or "street" motorcycle, for example. The straddle-type vehicle according to the present invention is not limited to a motorcycle, but may be an ATV (All Terrain Vehicle) or a four-wheel buggy, for example. As used herein, the term "straddle-type vehicle" refers to a vehicle that a rider straddles when getting on the vehicle.

In the following description, unless otherwise noted, the terms "front", "rear", "right", "left", "up" and "down" refer to front, rear, right, left, up and down with respect to a rider sitting on a seat 3 of the motorcycle 1, respectively. The terms "up" and "down" refer to a vertically upward direction and a vertically downward direction when the motorcycle 1 is brought to a stop on a horizontal plane, respectively. Reference signs "F", "Re", "R", "L", "Up" and "Dn" in the drawings represent front, rear, right, left, up and down, respectively. The above-mentioned directions are also used to describe components of a power unit 20. Specifically, the terms "front", "rear", "right", "left", "up" and "down" used to describe the power unit 20 installed on the motorcycle 1 refer to front, rear, right, left, up and down with respect to the rider, respectively.

As illustrated in FIG. 1, the motorcycle 1 preferably includes: a head pipe 5; a body frame 6 fixed to the head pipe 5; a front wheel 8; and a rear wheel 10. A front end portion of a rear arm 12 is connected to a rear portion of the body frame 6 via a pivot shaft 11. The rear wheel 10 is rotatably supported by a rear end portion of the rear arm 12.

The motorcycle 1 preferably includes the power unit 20. The power unit 20 is supported by the body frame 6 so as not to be swingable. The power unit 20 preferably includes an engine 22 that is an internal combustion engine.

The engine 22 preferably includes a crankcase 24, a cylinder body 30, and a cylinder head 31. The cylinder body 30 extends upward from a front portion of the crankcase 24. The cylinder head 31 is disposed on the cylinder body 30 and connected to the cylinder body 30.

Figure 2:
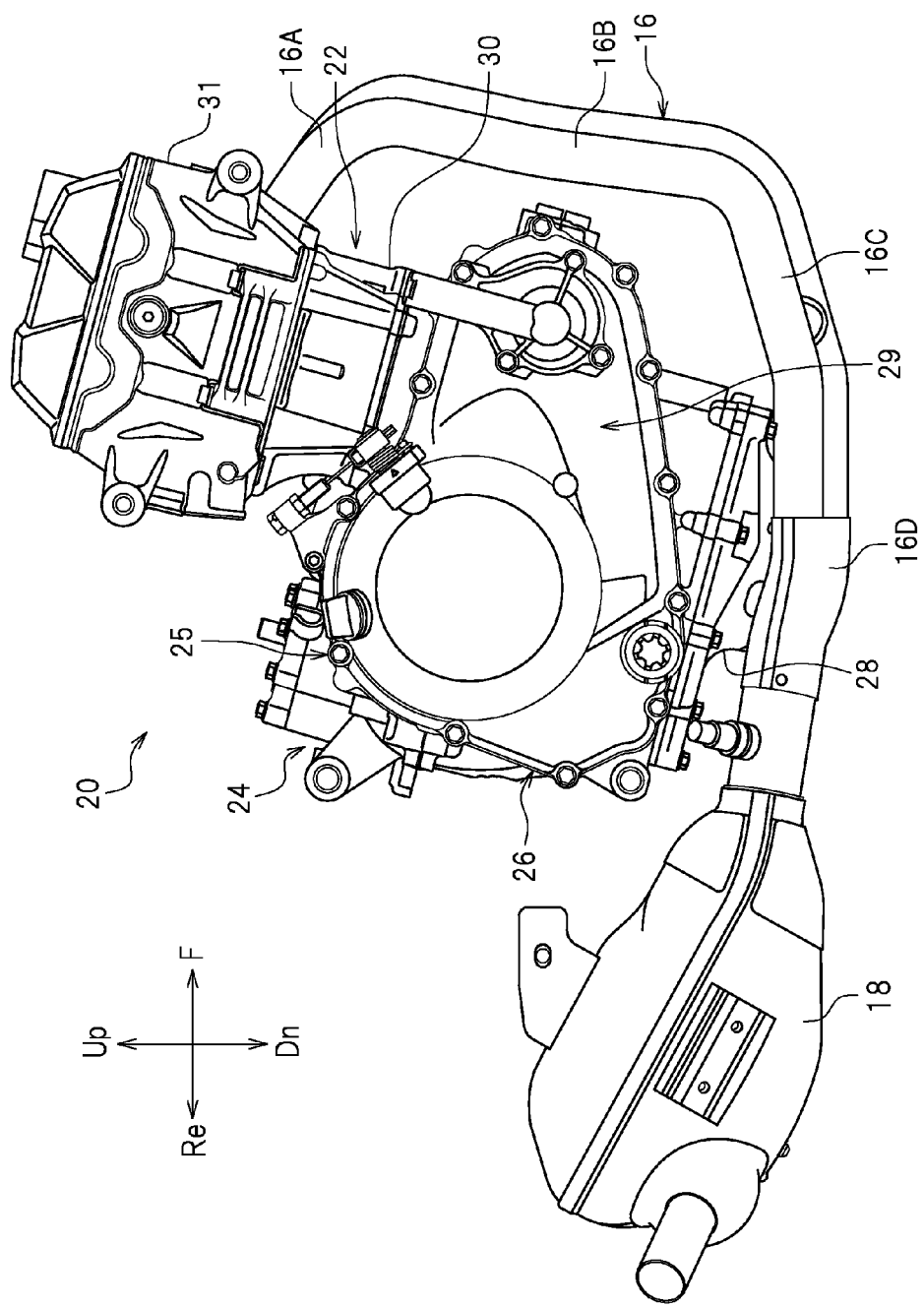
FIG. 2 is aright side view illustrating a power unit according to the first embodiment of the present invention.
Figure 3:
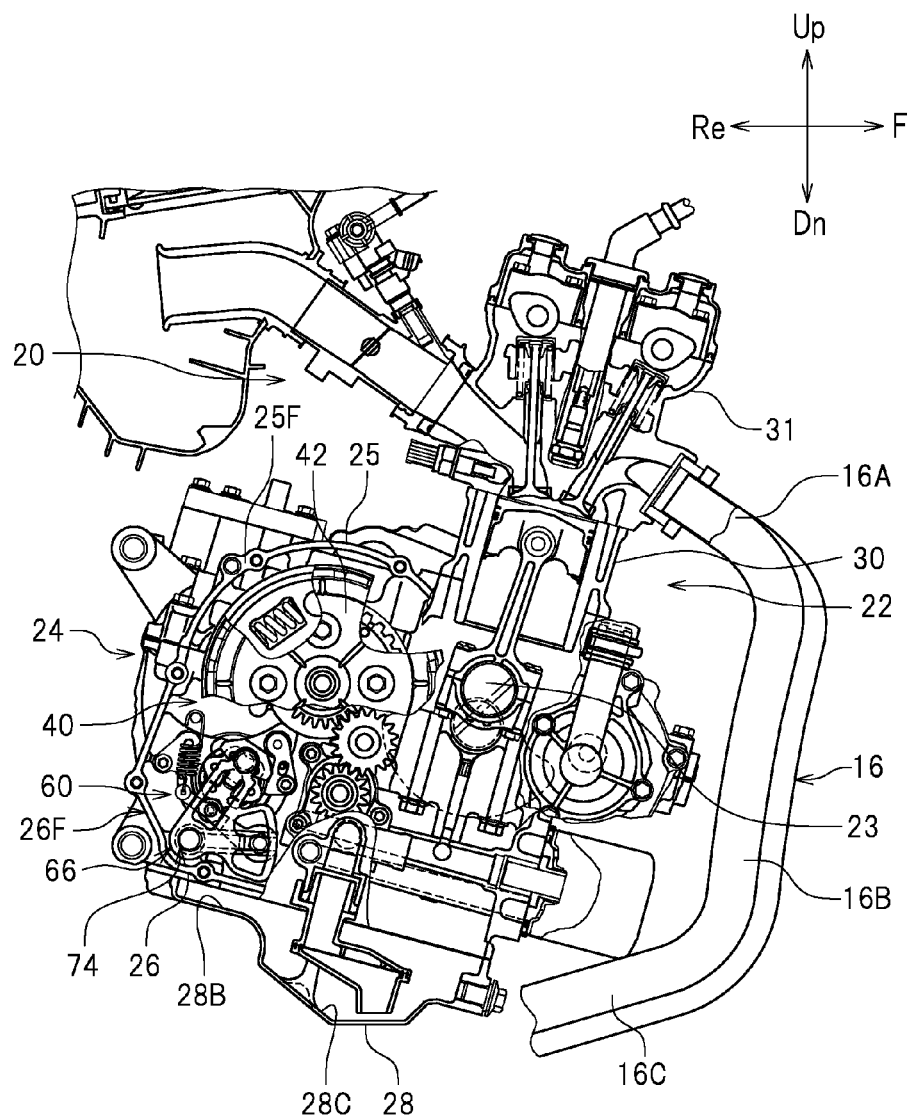
FIG. 3 is a cross-sectional view illustrating the power unit according to the first embodiment of the present invention.

The crankcase 24 preferably includes an upper crankcase 25, and a lower crankcase 26 located under the upper crankcase 25. An oil pan 28 is disposed under the lower crankcase 26. The oil pan 28 collects oil that has flowed through the power unit 20. The lower crankcase 26 and the oil pan 28 are connected to each other. As illustrated in FIG. 2, a cover 29 is attached to a lateral portion of the crankcase 24. As illustrated in FIG. 3, the upper crankcase 25 preferably includes a frame portion 25F to which the cover 29 (see FIG. 2) is attached when viewed in an axial direction of a shift shaft 74 (which will be described below). The lower crankcase 26 preferably includes a frame portion 26F to which the cover 29 is attached when viewed in the axial direction of the shift shaft 74. The frame portion 26F is located higher than the oil pan 28.

The engine 22 preferably further includes a crankshaft 23. The crankshaft 23 is disposed inside the crankcase 24.

Figure 4:
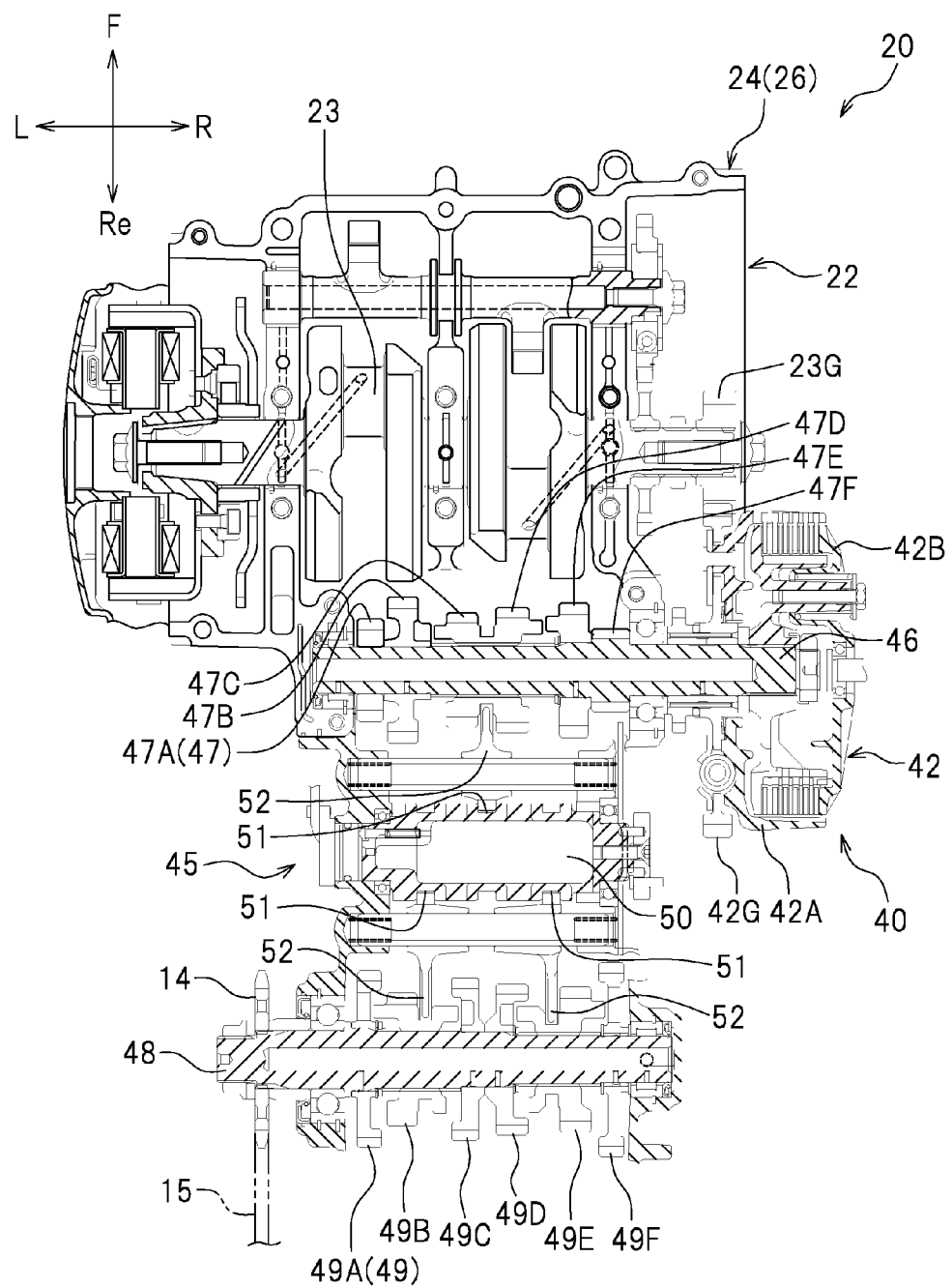
FIG. 4 is a cross-sectional view illustrating the power unit according to the first embodiment of the present invention.

The power unit 20 preferably includes a transmission 40. The transmission 40 is disposed inside the crankcase 24. As illustrated in FIG. 4, the transmission 40 preferably includes: a clutch 42 to which an engine torque of the crankshaft 23 is transmitted; and a transmission mechanism 45. The transmission mechanism 45 is a "dog clutch type" transmission. The transmission mechanism 45 preferably includes a main shaft 46, main shaft gears 47A to 47F, a drive shaft 48, and drive shaft gears 49A to 49F. Note that in the following description, the main shaft gears 47A to 47F may each be referred to as a "main shaft gear 47", and the drive shaft gears 49A to 49F may each be referred to as a "drive shaft gear 49".

The clutch 42 is a single plate or multi-plate friction clutch. It is to be noted that the clutch 42 is not limited to any particular type of clutch, but may be any clutch other than a friction clutch. The clutch 42 transmits or interrupts the engine torque. The clutch 42 is disposed inside the crankcase 24. The clutch 42 preferably includes a clutch housing 42A and a clutch boss 42B. The clutch housing 42A is provided with a primary gear 42G. The primary gear 42G intermeshes with a crank gear 23G fixed to the crankshaft 23. Therefore, the clutch housing 42A is connected to the crankshaft 23.

The main shaft 46 is disposed in parallel or substantially in parallel with the crankshaft 23. The main shaft 46 is located rearward relative to the crankshaft 23. The main shaft 46 is fixed to the clutch boss 42B. The main shaft 46 rotates together with the clutch boss 42B of the clutch 42. The main shaft gears 47A to 47F are provided on the main shaft 46. The main shaft gears 47A to 47F rotate together with the main shaft 46. The main shaft gears 47A, 47B, 47E and 47F are arranged so as not to be movable in an axial direction of the main shaft 46. The main shaft gears 47C and 47D are arranged so as to be movable in the axial direction of the main shaft 46.

The drive shaft 48 is disposed in parallel or substantially in parallel with the main shaft 46. The drive shaft 48 is located rearward relative to the main shaft 46. The drive shaft gears 49A to 49F are provided on the drive shaft 48. The drive shaft gears 49A to 49F rotate together with the drive shaft 48. The drive shaft gears 49A to 49F are arranged so that the drive shaft gears 49A to 49F intermesh with the main shaft gears 47A to 47F, respectively. The drive shaft gears 49A, 49C, 49D and 49F are arranged so as not to be movable in an axial direction of the drive shaft 48. The drive shaft gears 49B and 49E are arranged so as to be movable in the axial direction of the drive shaft 48.

A sprocket 14 is attached to a left end portion of the drive shaft 48. The sprocket 14 and the rear wheel 10 (see FIG. 1) are connected to each other through a chain 15.

Figure 5A:
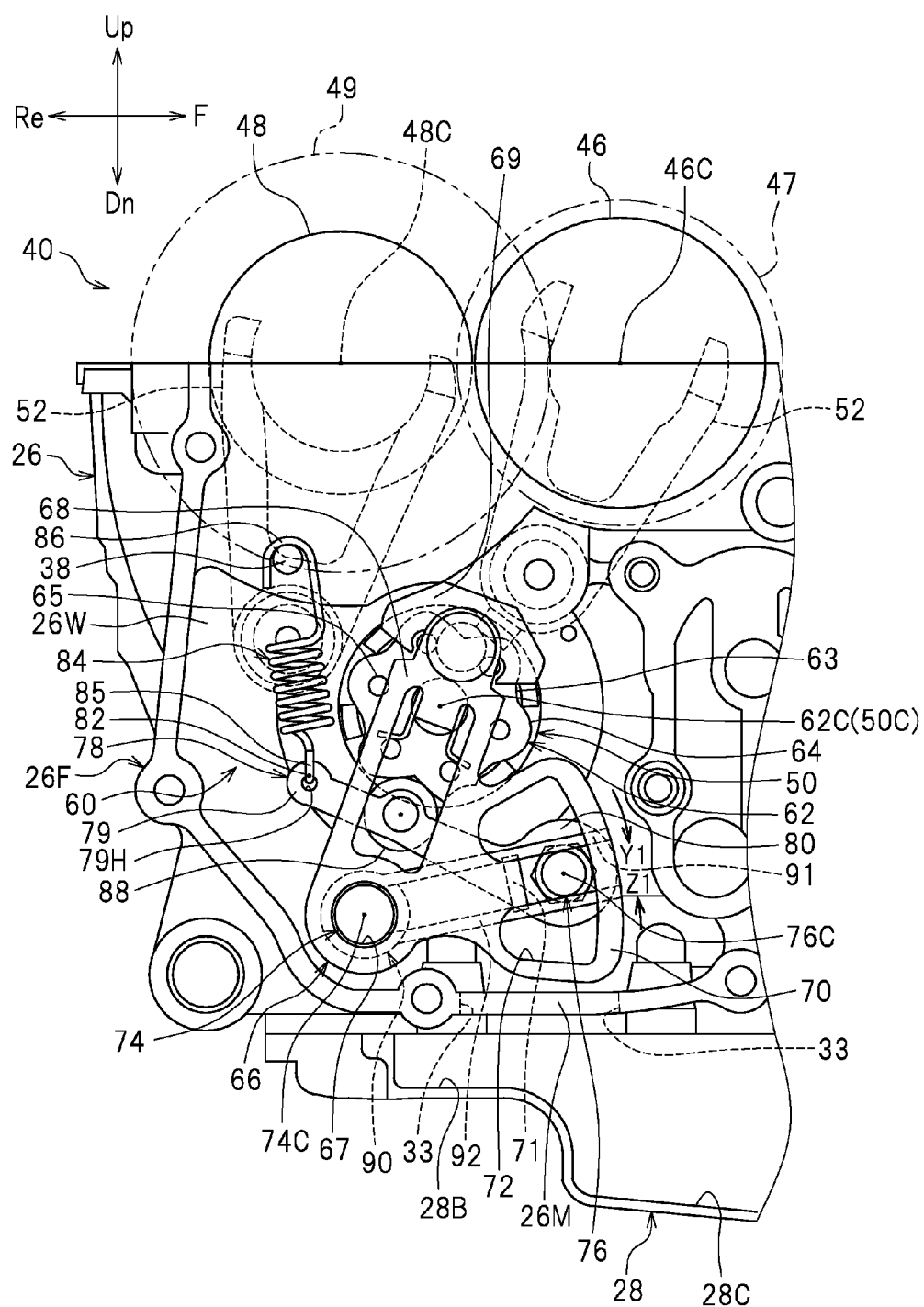
FIG. 5A is a side view illustrating a gear change mechanism according to the first embodiment of the present invention and its surrounding components in a state where a shift shaft is located at a first rotational position.

The transmission 40 preferably includes a shift drum 50 and a shift fork 52. The shift drum 50 is provided with a plurality of grooves 51 whose axial positions change in accordance with an angle of rotation of the shift drum 50. The shift fork 52 engages with each groove 51. The shift fork 52 engages with the main shaft gears 47C and 47D and the drive shaft gear 49B and 49E. Upon rotation of the shift drum 50, the shift fork 52 moves in an axial direction of the shift drum 50. Then, the shift fork 52 moves at least one of the main shaft gears 47C and 47D and the drive shaft gear 49B and 49E. As a result, a combination of the main shaft gear 47 and the drive shaft gear 49, which intermesh with each other, is changed, thus changing a transmission gear ratio. As illustrated in FIG. 5A, when viewed in the axial direction of the shift shaft 74 (which will be described below), a center 50C of the shift drum 50 is disposed lower than a center 46C of the main shaft 46.

Figure 6:
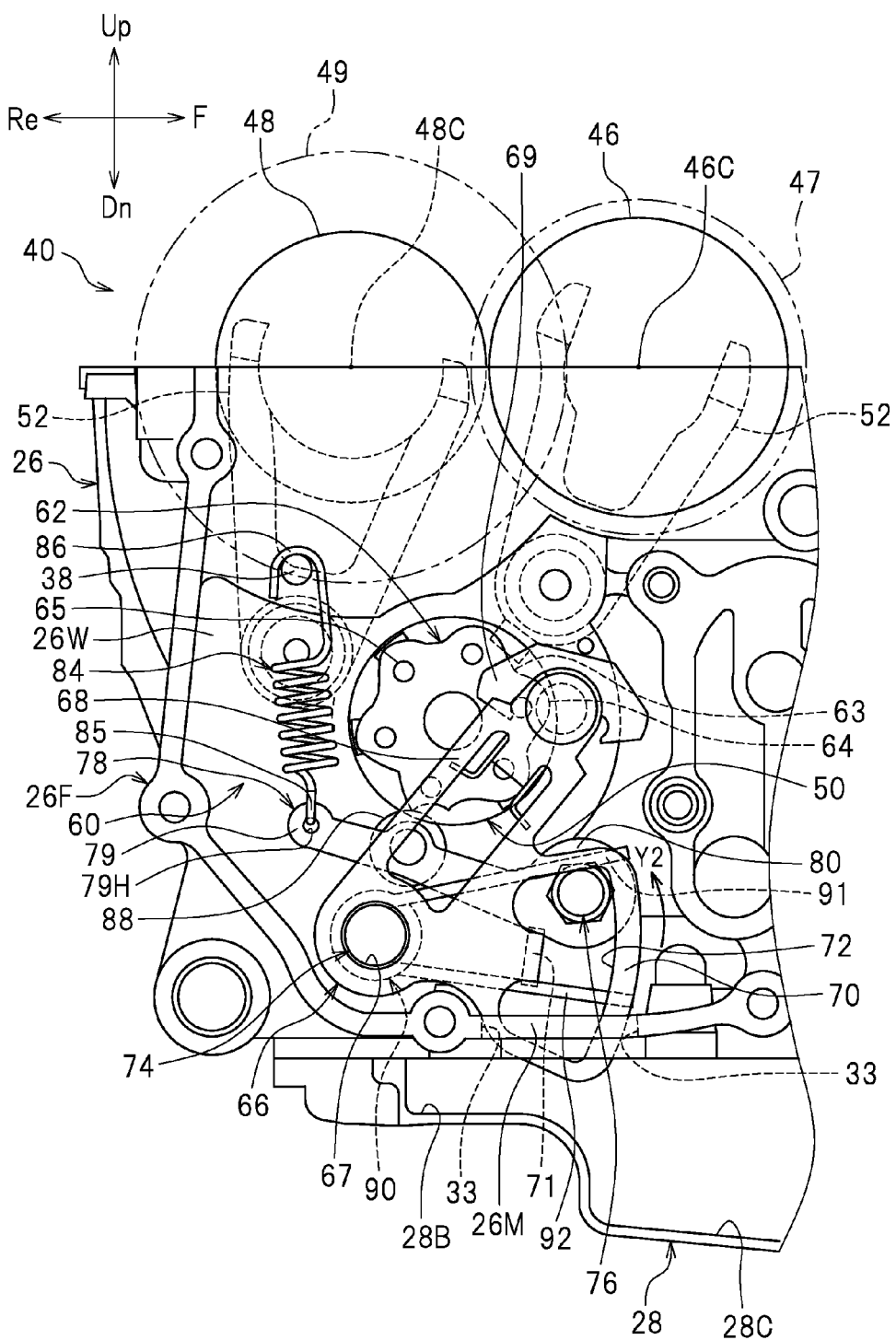
FIG. 6 is a side view illustrating the gear change mechanism according to the first embodiment of the present invention and its surrounding components in a state where the shift shaft is located at a second rotational position.
Figure 7:
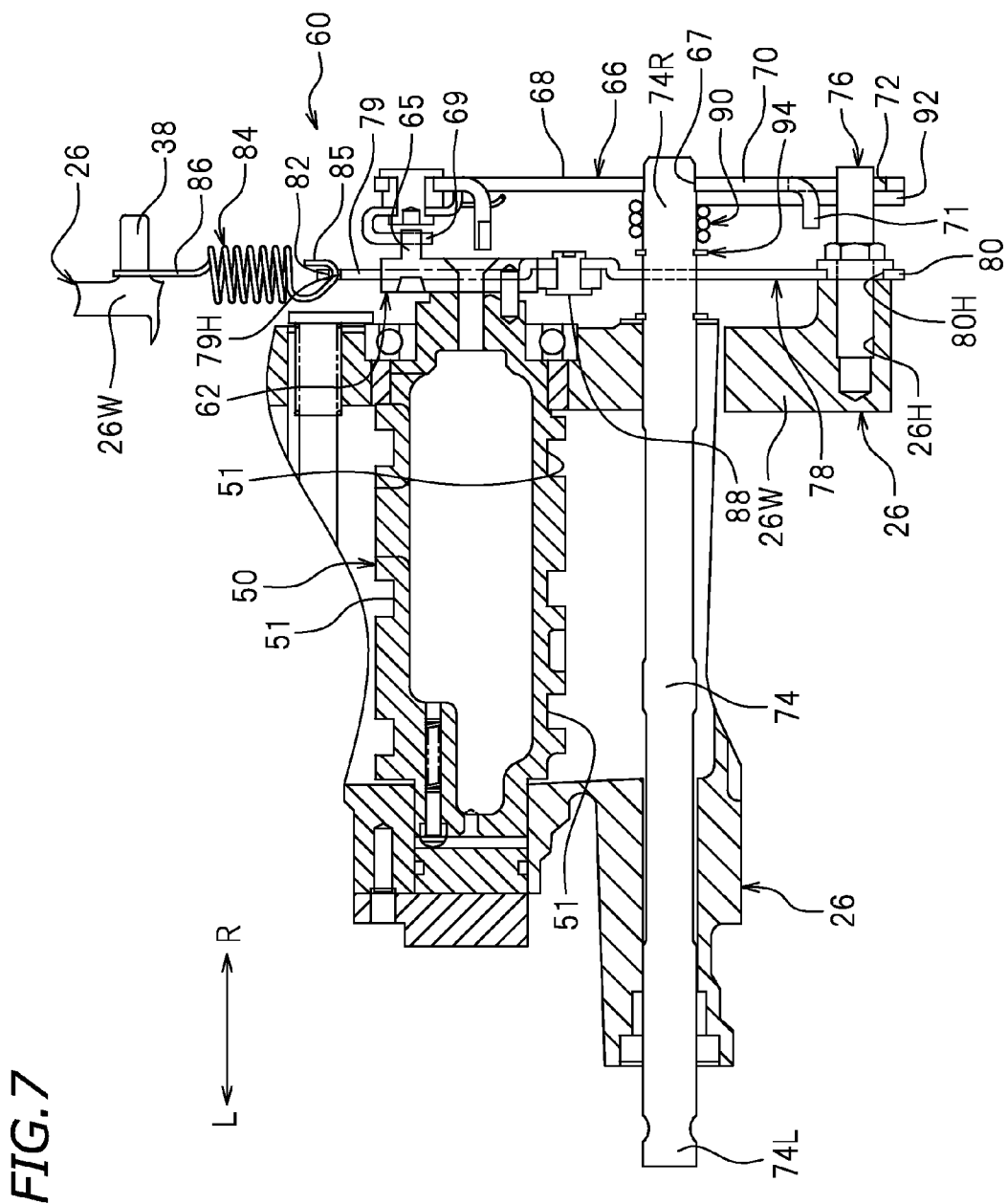
FIG. 7 is a cross-sectional view illustrating the gear change mechanism according to the first embodiment of the present invention and its surrounding components.

The transmission 40 preferably includes the shift shaft 74. The shift shaft 74 is rotatable between a first rotational position (see FIG. 5A) and a second rotational position (see FIG. 6). The term "first rotational position" as used herein refers to a position at which no load of a torsion spring 90 is applied to a shift lever 66 (which will be described below) and a second arm 70 of the shift lever 66 is not in contact with a support shaft 76. The term "first rotational position" also refers to a position at which the second arm 70 of the shift lever 66 is not in contact with the support shaft 76 and a stopper roller 88 is engaged with a recessed portion 63 of a rotation plate 62. The term "second rotational position" as used herein refers to a position at which the load of the torsion spring 90 is applied to the shift lever 66 and the second arm 70 of the shift lever 66 is in contact with the support shaft 76. In the example shown in FIG. 6, the stopper roller 88 is not engaged with the recessed portion 63 of the rotation plate 62. But the stopper roller 88 is being engaged with the recessed portion 63 of the rotation plate 62 with the rotation of the rotation plate 62 forced by the elastic member 84. When the shift shaft 74 is located at the second rotational position, the stopper roller 88 may be engaged with the recessed portion 63 of the rotation plate 62, or the stopper roller 88 may not be engaged with the recessed portion 63 of the rotation plate 62. As illustrated in FIG. 7, the shift shaft 74 is supported by the lower crankcase 26. A left end portion 74L of the shift shaft 74 is located outward of the lower crankcase 26. A shift pedal 19 (see FIG. 1) is attached to the left end portion 74L of the shift shaft 74 via a link mechanism 17 (see FIG. 1). Alternatively, the shift pedal 19 may be directly attached to the left end portion 74L of the shift shaft 74. A right end portion 74R of the shift shaft 74 is inserted into a shift shaft insertion hole 67 of the shift lever 66 and thus fixed to the shift lever 66. As illustrated in FIG. 5A, when viewed in the axial direction of the shift shaft 74, a center 74C of the shift shaft 74 is disposed lower than the center 46C of the main shaft 46 and a center 48C of the drive shaft 48. When viewed in the axial direction of the shift shaft 74, the center 74C of the shift shaft 74 is located lower than a center 62C of the rotation plate 62. When viewed in the axial direction of the shift shaft 74, the center 74C of the shift shaft 74 is located rearward relative to the center 46C of the main shaft 46. When viewed in the axial direction of the shift shaft 74, the center 74C of the shift shaft 74 is located lower than the center 50C of the shift drum 50.

The transmission 40 preferably further includes a gear change mechanism 60. The gear change mechanism 60 preferably includes the rotation plate 62, the shift lever 66, the support shaft 76, a stopper lever 78, the stopper roller 88, and an elastic member 84.

The rotation plate 62 rotates together with the shift drum 50. The rotation plate 62 preferably includes an outer peripheral surface 64 provided with a plurality of the recessed portions 63. The rotation plate 62 preferably further includes a plurality of pins 65. In the present embodiment, the pins 65 are arranged at intervals of 60 degrees along an outer periphery of the rotation plate 62. The center 62C of the rotation plate 62 is located lower than the center 46C of the main shaft 46. The center 62C of the rotation plate 62 is located lower than the center 48C of the drive shaft 48. As illustrated in FIG. 7, the rotation plate 62 is fixed to a right end of the shift drum 50.

Figure 5B:
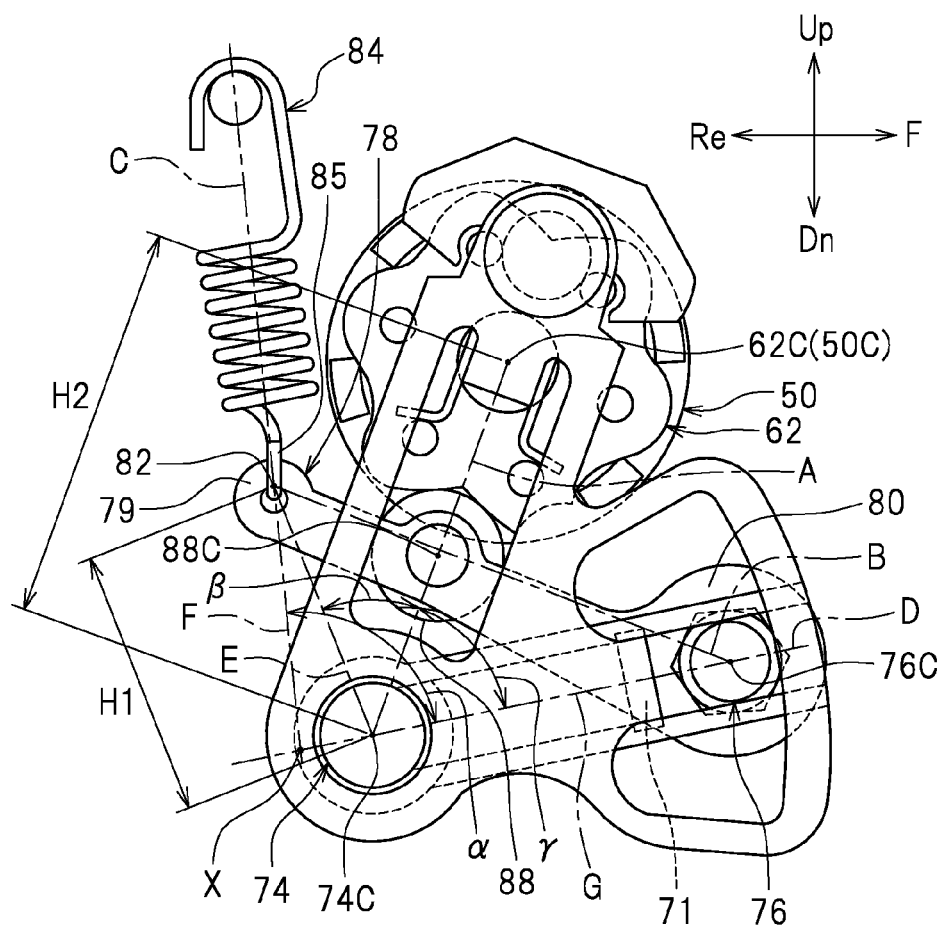
FIG. 5B is a side view illustrating the gear change mechanism according to the first embodiment of the present invention.

The shift lever 66 engages with the rotation plate 62. As illustrated in FIG. 5A, the shift lever 66 is provided with the shift shaft insertion hole 67 into which the shift shaft 74 is inserted. The shift lever 66 preferably includes a first arm 68 and the second arm 70 which extend in two different directions at given angles with respect to a center of the shift shaft insertion hole 67. A front end portion of the first arm 68 is provided with a hook 69 that is engageable with the pin 65. As illustrated in FIG. 7, the hook 69 is located between the first arm 68 and the rotation plate 62. As illustrated in FIG. 5A, the second arm 70 is provided with an opening 72. When viewed in the axial direction of the shift shaft 74, the opening 72 and the support shaft 76 overlap with each other. The second arm 70 is provided with a protrusion 71. As illustrated in FIG. 5B, when viewed in the axial direction of the shift shaft 74, the protrusion 71 extends in a direction that intersects a line (second line) D that passes through the center 74C of the shift shaft 74 and a center 76C of the support shaft 76. As illustrated in FIG. 7, the protrusion 71 extends toward the stopper lever 78. As illustrated in FIG. 5A, when viewed in the axial direction of the shift shaft 74, the shift lever 66 is disposed so that the shift lever 66 is located higher than a lower wall 26M (see also FIG. 9) of the frame portion 26F of the lower crankcase 26 when the shift shaft 74 is located at the first rotational position.

As illustrated in FIG. 7, the support shaft 76 is disposed in parallel or substantially in parallel with the shift drum 50. The support shaft 76 is in parallel or substantially in parallel with the shift shaft 74. A portion of the support shaft 76 is inserted into an insertion hole 26H of a partition wall 26W of the lower crankcase 26 and thus fixed to the lower crankcase 26. As illustrated in FIG. 5A, the support shaft 76 is located forward relative to the center 74C of the shift shaft 74. The support shaft 76 is located forward relative to the protrusion 71 of the shift lever 66.

The stopper lever 78 preferably includes a first end portion 79 and a second end portion 80. As illustrated in FIG. 7, the second end portion 80 is provided with a support shaft insertion hole 80H. The support shaft 76 is inserted through the support shaft insertion hole 80H. As illustrated in FIG. 5A, the second end portion 80 is rotatably supported by the support shaft 76. The stopper lever 78 is rotatable around the support shaft 76. The first end portion 79 is provided with an insertion hole 79H through which a first engagement end portion 85 of the elastic member 84 (which will be described below) is inserted. As illustrated in FIG. 5B, when viewed in the axial direction of the shift shaft 74, the stopper lever 78 is disposed to intersect a first line segment A that connects the center 74C of the shift shaft 74 to the center 62C of the rotation plate 62. As illustrated in FIG. 5A, when viewed in the axial direction of the shift shaft 74, the stopper lever 78 is disposed so that the stopper lever 78 is located higher than the lower wall 26M of the frame portion 26F of the lower crankcase 26 when the shift shaft 74 is located at the first rotational position.

The stopper roller 88 is provided in the stopper lever 78. The stopper roller 88 is provided between the first and second end portions 79 and 80 of the stopper lever 78. The stopper roller 88 engages with the recessed portion 63 of the rotation plate 62 when the shift shaft 74 is located at the first rotational position. As illustrated in FIG. 5B, when viewed in the axial direction of the shift shaft 74, the stopper roller 88 is disposed on a second line segment B that connects the center 76C of the support shaft 76 to a connection 82 between the first end portion 79 of the stopper lever 78 and the first engagement end portion 85 of the elastic member 84 to each other. When the stopper roller 88 is engaged with the recessed portion 63 of the rotation plate 62, the second line segment B is separate from the rotation plate 62 as viewed in the axial direction of the shift shaft 74. When the stopper roller 88 is engaged with the recessed portion 63 of the rotation plate 62, the stopper roller 88 is disposed on the first line segment A as viewed in the axial direction of the shift shaft 74.

The elastic member 84 applies a force to the stopper lever 78 so as to press the stopper roller 88 against the recessed portion 63 of the rotation plate 62. As illustrated in FIG. 5A, the elastic member 84 preferably includes the first and second engagement end portions 85 and 86. The first engagement end portion 85 engages with the first end portion 79 of the stopper lever 78. The first engagement end portion 85 is inserted through the insertion hole 79H of the first end portion 79. The second engagement end portion 86 engages with a boss 38 of the lower crankcase 26 (which will be described below). The elastic member 84 is disposed rearward relative to the shift drum 50. The elastic member 84 is disposed higher than the shift shaft 74. The elastic member 84 is disposed lower than the main shaft 46 and the drive shaft 48. The elastic member 84 according to the present embodiment is a tension spring. It is to be noted that the elastic member 84 is not limited to a tension spring but may be a compression spring or rubber, for example.

Figure 8:
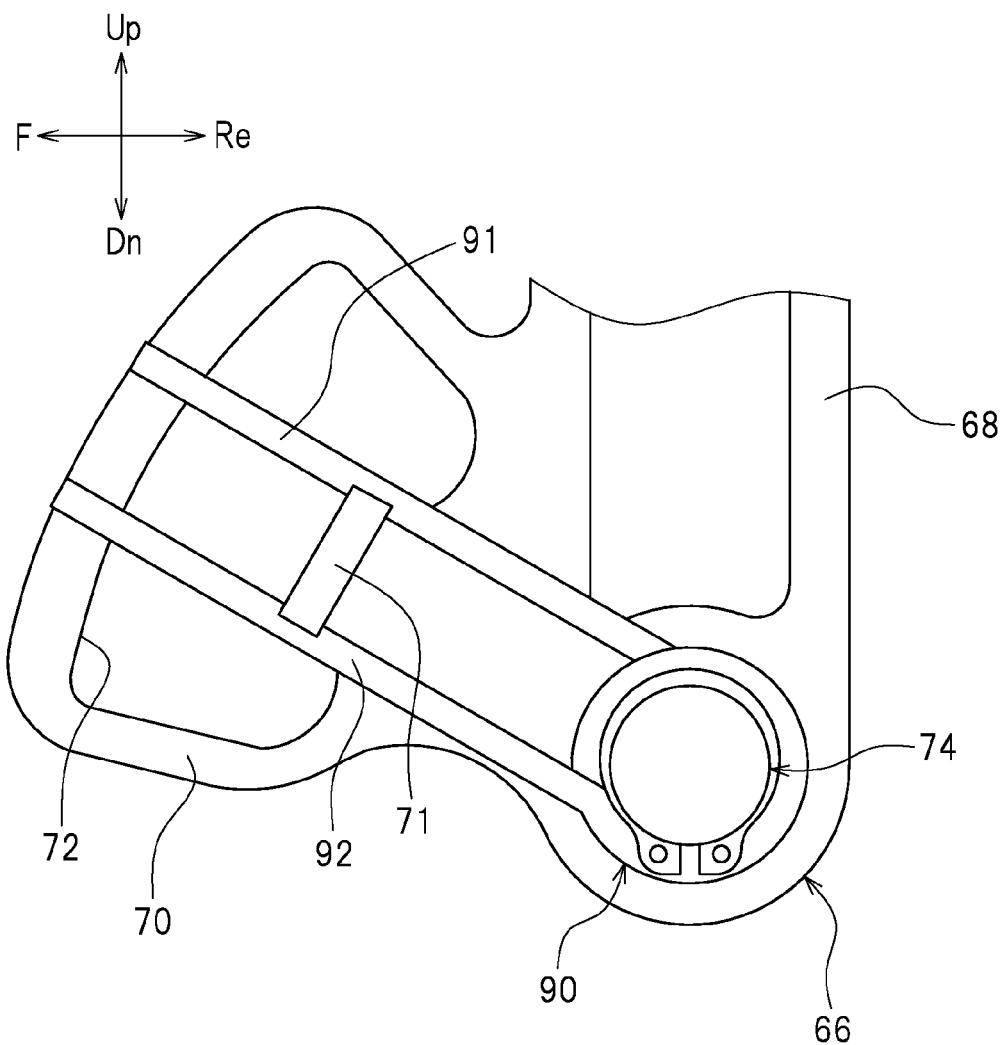
FIG. 8 is a left side view illustrating a shift lever according to the first embodiment of the present invention.

As illustrated in FIG. 7, the gear change mechanism 60 preferably includes the torsion spring 90. The torsion spring 90 is attached to the right end portion 74R of the shift shaft 74. The torsion spring 90 and the stopper lever 78 are deviated from each other in the axial direction of the shift shaft 74. The torsion spring 90 is located leftward of the shift lever 66. The torsion spring 90 is located rightward of the stopper lever 78. As illustrated in FIG. 5A, the torsion spring 90 preferably includes a first arm portion 91 and a second arm portion 92 which are adjacent to each other, with the shift shaft 74 interposed therebetween. The support shaft 76 is disposed between the first and second arm portions 91 and 92. The first and second arm portions 91 and 92 are engageable with the support shaft 76. As illustrated in FIG. 8, the protrusion 71 of the shift lever 66 is disposed between the first and second arm portions 91 and 92. As illustrated in FIG. 5A, when viewed in the axial direction of the shift shaft 74, portions of the first and second arm portions 91 and 92 overlap the second arm 70 of the shift lever 66. The first and second arm portions 91 and 92 are engageable with the protrusion 71 of the shift lever 66.

As illustrated in FIG. 7, a stopper 94 that restricts axial movement of the torsion spring 90 is attached to the right end portion 74R of the shift shaft 74. The stopper 94 is located rightward of the stopper lever 78. The stopper 94 is located leftward of the torsion spring 90.

Figure 9:
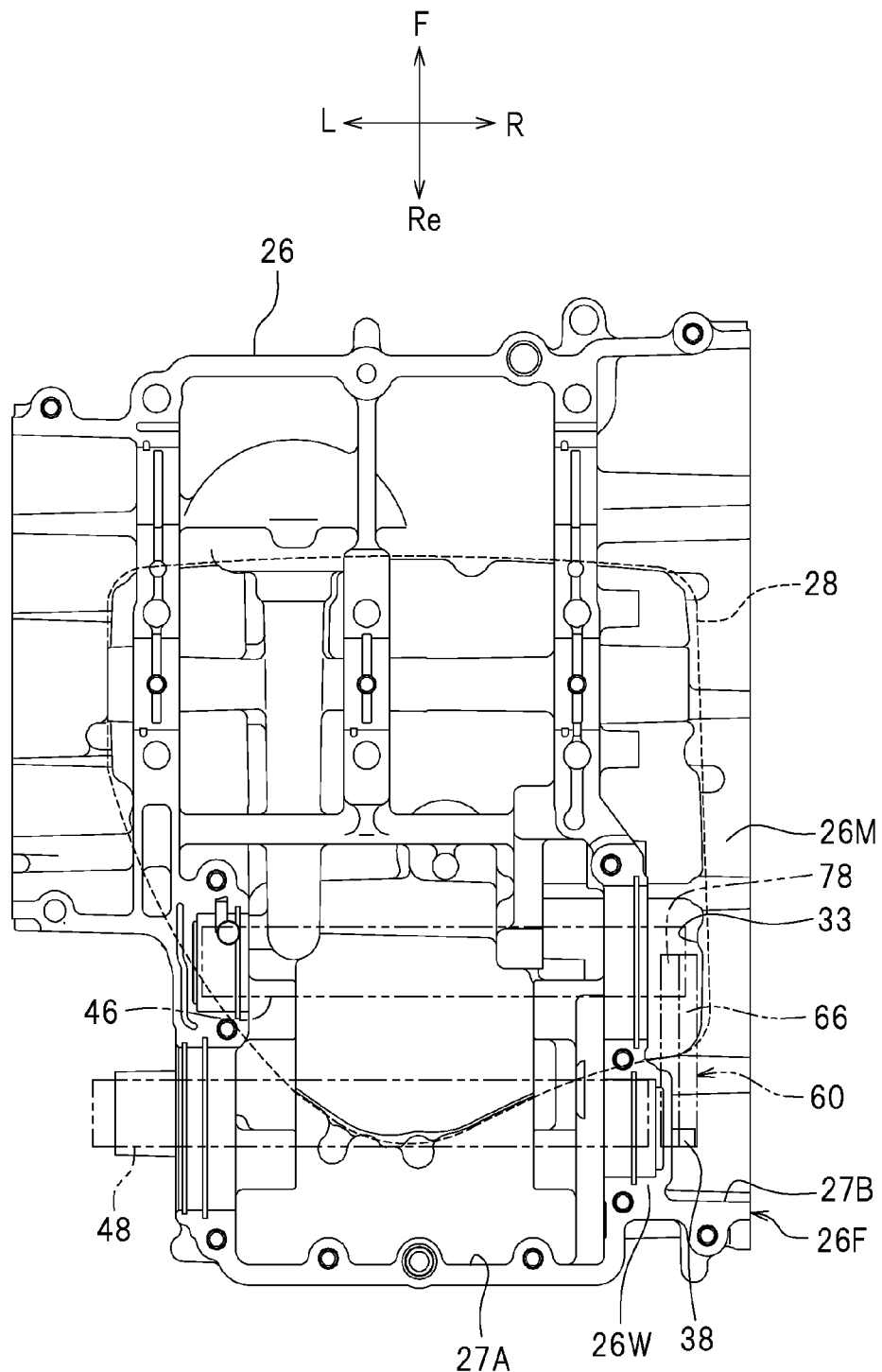
FIG. 9 is a plan view of a lower crankcase according to the first embodiment of the present invention.

As illustrated in FIG. 9, the lower crankcase 26 preferably includes: a first chamber 27A that houses the main shaft 46 and the drive shaft 48; and a second chamber 27B that houses the gear change mechanism 60. The partition wall 26W serves as a partition between the first and second chambers 27A and 27B. The partition wall 26W is provided with the boss 38. The partition wall 26W and the boss 38 are cast in one piece. The boss 38 is located in the second chamber 27B. As illustrated in FIG. 7, the boss 38 extends from the partition wall 26W in a direction perpendicular or substantially perpendicular to an axial direction of the elastic member 84. The boss 38 is disposed in parallel or substantially in parallel with the shift shaft 74. The boss 38 is engaged with the second engagement end portion 86 of the elastic member 84. As illustrated in FIG. 5A, the boss 38 is disposed to overlap the drive shaft gears 49 when viewed in the axial direction of the main shaft 46. Alternatively, the boss 38 may overlap the main shaft 46, the main shaft gears 47 and/or the drive shaft 48 when viewed in the axial direction of the main shaft 46.

As illustrated in FIG. 5A, the frame portion 26F of the lower crankcase 26 preferably includes the lower wall 26M located below the shift lever 66 and the stopper lever 78 and above the oil pan 28. As illustrated in FIG. 9, the lower wall 26M is provided with an opening 33. In a plan view, a portion of the shift lever 66 overlaps the opening 33. In the plan view, a portion of the stopper lever 78 overlaps the opening 33.

Figure 10:
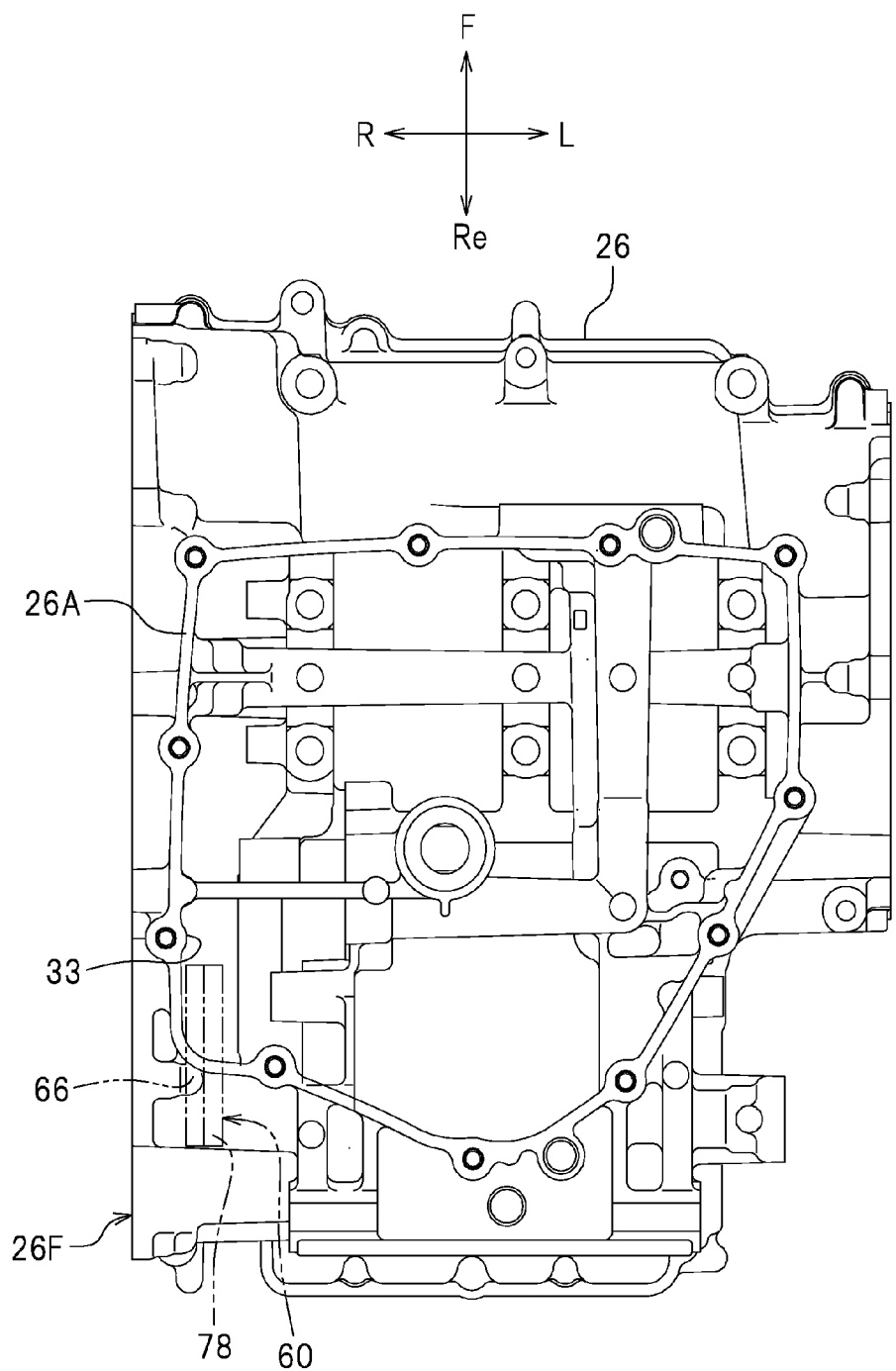
FIG. 10 is a bottom view of the lower crankcase according to the first embodiment of the present invention.
Figure 11A:
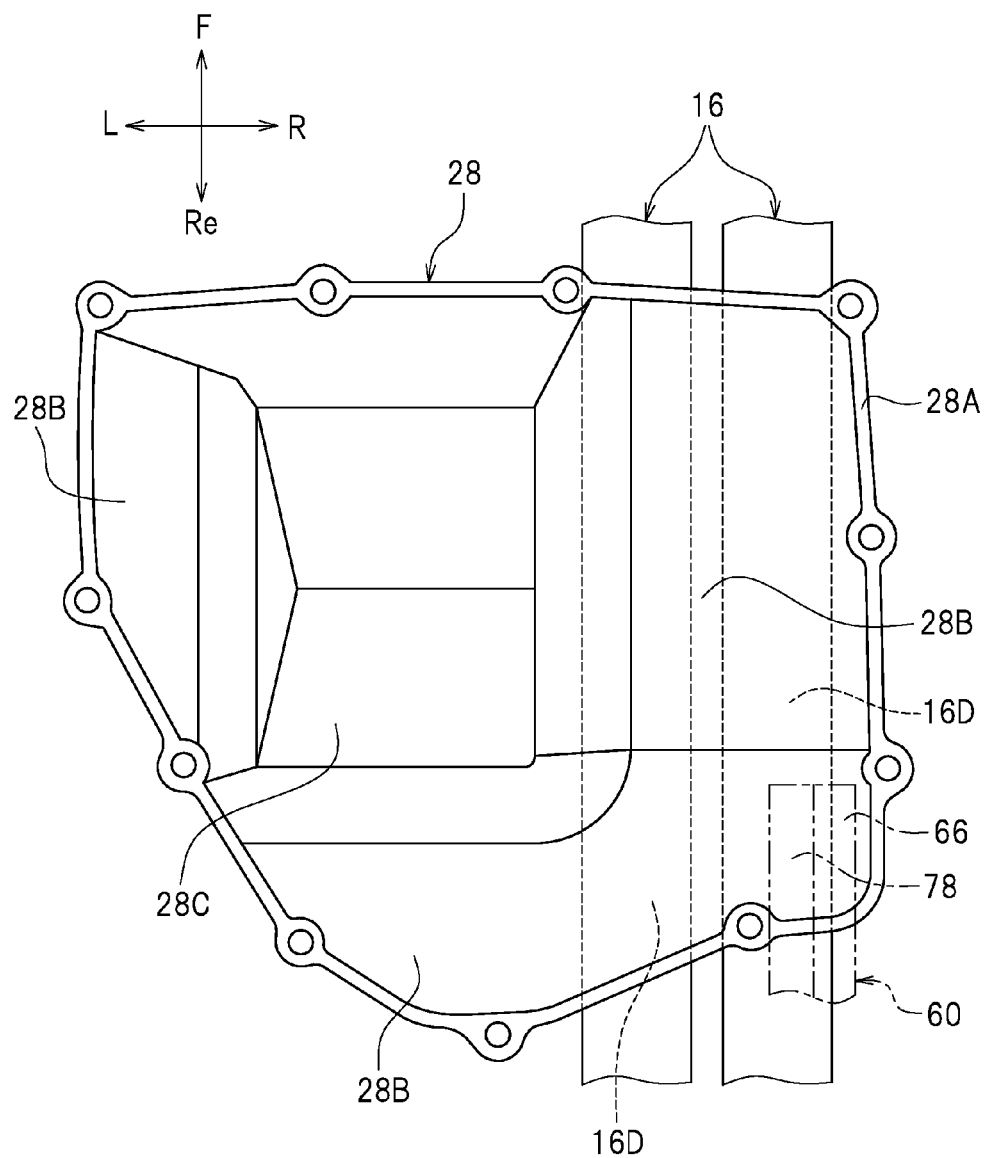
FIG. 11A is a plan view of an oil pan according to the first embodiment of the present invention.
Figure 11B:
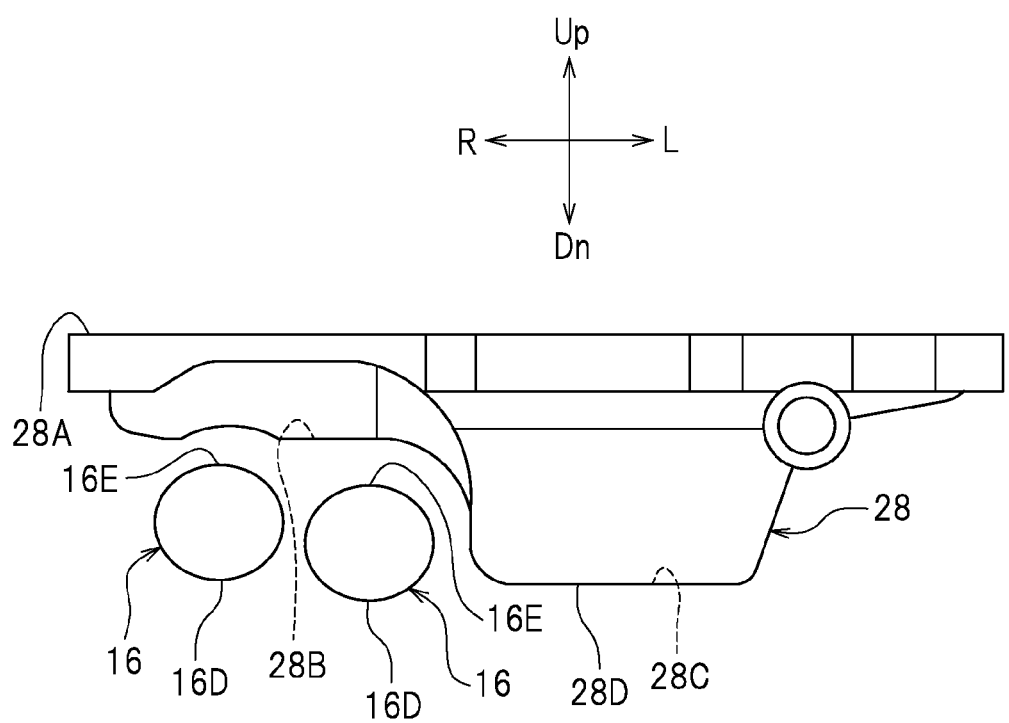
FIG. 11B is a front view of the oil pan according to the first embodiment of the present invention.

As illustrated in FIG. 10, the lower crankcase 26 preferably includes a lower surface 26A that faces an upper surface 28A (see FIGS. 11A and 11B) of the oil pan 28 (see FIGS. 11A and 11B).

As illustrated in FIGS. 11A and 11B, the oil pan 28 preferably includes the upper surface 28A that faces the lower surface 26A (see FIG. 10) of the lower crankcase 26 (see FIG. 10). The oil pan 28 preferably includes: a first lower wall 28B; and a second lower wall 28C recessed downward from the first lower wall 28B. In the plan view, a portion of the shift lever 66 and the first lower wall 28B of the oil pan 28 overlap with each other. In the plan view, a portion of the stopper lever 78 and the first lower wall 28B of the oil pan 28 overlap with each other. The first lower wall 28B has an area larger than that of the second lower wall 28C.

As illustrated in FIG. 1, the motorcycle 1 preferably includes: an exhaust pipe 16 through which exhaust gas discharged from the engine 22 flows; and a silencer 18. The exhaust pipe 16 is connected to the engine 22. Specifically, as illustrated in FIG. 2, the exhaust pipe 16 preferably includes: a first portion 16A that extends obliquely downward and forward from the cylinder head 31; a second portion 16B that extends downward from the first portion 16A; a third portion 16C that extends obliquely downward and rearward from the second portion 16B; and a fourth portion 16D that extends rearward from the third portion 16C. The fourth portion 16D is disposed lower than the lower crankcase 26. The silencer 18 is connected to a rear end portion of the exhaust pipe 16.

As illustrated in FIG. 11A, the fourth portion 16D of the exhaust pipe 16 overlaps the first lower wall 28B of the oil pan 28 in the plan view. As illustrated in FIG. 11B, the fourth portion 16D of the exhaust pipe 16 is disposed below the first lower wall 28B of the oil pan 28. An upper end 16E of the fourth portion 16D is located higher than a lower end 28D of the second lower wall 28C of the oil pan 28.

Next, how the gear change mechanism 60 operates will be described. FIG. 5A illustrates the gear change mechanism 60 and its surrounding components, with the shift shaft 74 located at the first rotational position. FIG. 6 illustrates the gear change mechanism 60 and its surrounding components, with the shift shaft 74 located at the second rotational position. When the shift pedal 19 (see FIG. 1) is operated by the rider, the shift shaft 74 rotates from the first rotational position toward the second rotational position, so that the shift lever 66 rotates in a direction indicated by an arrow Y1 in FIG. 5A. With the rotation of the shift lever 66, the hook 69 of the shift lever 66 and the pin 65 of the rotation plate 62 engage with each other. The pin 65 receives a force from the hook 69, thus rotating the rotation plate 62 and the shift drum 50. In this case, the first arm portion 91 of the torsion spring 90 engages with the support shaft 76. Therefore, the first arm portion 91 does not rotate in the direction indicated by the arrow Y1 in FIG. 5A. The second arm portion 92 of the torsion spring 90 is in engagement with the protrusion 71. Hence, with the rotation of the shift lever 66, the second arm portion 92 moves in the direction indicated by the arrow Y1 in FIG. 5A. When the shift lever 66 continues to rotate in the direction indicated by the arrow Y1 in FIG. 5A, the second arm 70 comes into contact with the support shaft 76 (see FIG. 6). As a result, further rotation of the shift lever 66 in the direction indicated by the arrow Y1 is restricted.

As illustrated in FIG. 6, when the shift shaft 74 is located at the second rotational position, a portion of the second arm 70 of the shift lever 66 is located lower than the lower wall 26M of the frame portion 26F of the lower crankcase 26 and inside the oil pan 28 as viewed in the axial direction of the shift shaft 74. In other words, a portion of the second arm 70 moves into the oil pan 28 through the opening 33 in the lower wall 26M of the frame portion 26F of the lower crankcase 26. When the shift shaft 74 is located at the second rotational position, a portion of the opening 72 of the shift lever 66 overlaps the lower wall 26M of the frame portion 26F as viewed in the axial direction of the shift shaft 74. Upon rotation of the shift drum 50 and completion of a speed change, a restoring force of the torsion spring 90 causes the second arm portion 92 and the protrusion 71 to move in a direction indicated by an arrow Y2 in FIG. 6. Thus, the shift lever 66 also moves in the direction indicated by the arrow Y2 in FIG. 6. As a result, the shift lever 66 returns to the first rotational position from the second rotational position, and the hook 69 of the shift lever 66 and the pin 65 of the rotation plate 62 are disengaged from each other. Note that when the shift pedal 19 (see FIG. 1) is operated by the rider, the shift shaft 74 may rotate so that the shift lever 66 moves in a direction indicated by an arrow Z1 in FIG. 5A. As a result, the shift drum 50 is rotated to perform a speed change.

As illustrated in FIG. 5B, when a point of intersection of a line (first line) C that extends along an axis of the elastic member 84 and the line (second line) D that passes through the center 74C of the shift shaft 74 and the center 76C of the support shaft 76 is defined as a first point X as viewed in the axial direction of the shift shaft 74, an angle α formed between a line segment (third line segment) F that connects the connection 82 to the first point X and a line segment (fourth line segment) G that connects the first point X to the center 76C of the support shaft 76 is 90 degrees or less. When viewed in the axial direction of the shift shaft 74, an angle β formed between a line segment (fifth line segment) E that connects the connection 82 to the center 74C of the shift shaft 74 and the first line segment A that connects the center 74C of the shift shaft 74 to the center 62C of the rotation plate 62 is equal to or smaller than an angle γ formed between the line D that passes through the center 74C of the shift shaft 74 and the center 76C of the support shaft 76 and the first line segment A that connects the center 74C of the shift shaft 74 to the center 62C of the rotation plate 62. When viewed in the axial direction of the shift shaft 74, a distance H1 between the connection 82 and the center 74C of the shift shaft 74 is shorter than a distance H2 between the center 74C of the shift shaft 74 and the center 62C of the rotation plate 62.

As mentioned above, in the power unit 20 according to the present embodiment, the elastic member 84 that applies a force to the stopper lever 78 is attached to the first end portion 79 of the stopper lever 78, which means that the elastic member 84 is not provided on the support shaft 76. Therefore, a frictional force is prevented from being generated between the elastic member 84 and the support shaft 76 and/or stopper lever 78. Hence, the stopper lever 78 is smoothly rotated when a speed change is performed. The stopper roller 88 is disposed between the first and second end portions 79 and 80 of the stopper lever 78. The elastic member 84 applies a force to the first end portion 79 of the stopper lever 78, and therefore, the stopper roller 88 located between the first and second end portions 79 and 80 is pressed against the recessed portion 63 of the rotation plate 62 with a force equal to or greater than the force applied from the elastic member 84. Thus, even when the force applied from the elastic member 84 is reduced, the stopper roller 88 is sufficiently pressed against the recessed portion 63. When viewed in the axial direction of the shift shaft 74, a spacing is provided between the shift shaft 74 and the rotation plate 62. The spacing between the shift shaft 74 and the rotation plate 62 is effectively utilized so that a portion of the stopper lever 78 is disposed between the shift shaft 74 and the rotation plate 62, thus compactly disposing the stopper lever 78.

For example, when a compression spring is used as the elastic member 84, its spring force might be spread in all directions upon compression of the spring. Therefore, a periphery of the compression spring has to be enclosed with a tubular member. However, in the present embodiment, a tension spring is used as the elastic member 84, thus preventing its spring force from being spread in all directions. Consequently, the periphery of the elastic member 84 does not have to be enclosed with an auxiliary member, resulting in a simple structure.

As illustrated in FIG. 5B, when viewed in the axial direction of the shift shaft 74, each member is disposed so that the second line segment B, which connects the connection 82 to the center 76C of the support shaft 76, is separate from the rotation plate 62. Therefore, the stopper lever 78 does not move along the periphery of the rotation plate 62. As a result, layout flexibility of the elastic member 84 is increased. The spacing between the shift shaft 74 and the rotation plate 62 is effectively utilized so that the stopper roller 88 is disposed on the first line segment A, thus compactly disposing the stopper roller 88.

As illustrated in FIG. 7, the torsion spring 90 and the stopper lever 78 are disposed so as to be adjacent to each other in the axial direction of the shift shaft 74. Therefore, when a speed change is performed, the torsion spring 90 might move axially and interfere with the stopper lever 78. However, according to the present embodiment, the stopper 94 disposed between the torsion spring 90 and the stopper lever 78 restricts the axial movement of the torsion spring 90. As a result, interference between the stopper lever 78 and the torsion spring 90 is prevented reliably.

As illustrated in FIG. 5A, in the present embodiment, the support shaft 76 also serves as a stopper shaft that restricts movement of the torsion spring 90. Thus, the support shaft 76 and the stopper shaft do not have to be provided separately. Hence, the number of components is reduced, and the gear change mechanism 60 is made compact in size. In the present embodiment, as illustrated in FIG. 5B, the stopper lever 78 is disposed to intersect the first line segment A, and therefore, the stopper lever 78 protrudes on both sides of the first line segment A. However, since the support shaft 76 and the stopper shaft do not have to be provided separately, the gear change mechanism 60 is made compact in size even though the stopper lever 78 protrudes on both sides of the first line segment A.

As illustrated in FIG. 5B, when viewed in the axial direction of the shift shaft 74, the stopper roller 88 is located on the second line segment B, and therefore, the stopper lever 78 has a linear shape. Thus, the stopper lever 78 is reduced in size and weight. As a result, the gear change mechanism 60 is made compact in size.

As illustrated in FIG. 5B, at least a portion of the elastic member 84 is disposed within a range of 90 degrees or less formed between: the line segment G that connects the first point X to the center 76C of the support shaft 76; and the line segment F that connects the connection 82 to the first point X. As a result, the gear change mechanism 60 is made compact in size.

As illustrated in FIG. 5B, the connection 82 is located close to the first line segment A, and the elastic member 84 is disposed close to the shift lever 66, thus making the gear change mechanism 60 compact in size.

The connection 82 is located close to the shift shaft 74. Thus, the elastic member 84 is disposed close to the shift shaft 74, and therefore, the gear change mechanism 60 is made compact in size.

As illustrated in FIG. 7, the boss 38, which engages with the second engagement end portion 86 of the elastic member 84, and the partition wall 26W of the lower crankcase 26 are cast in one piece. Hence, the power unit 20 is manufactured at a lower cost. The partition wall 26W and the boss 38 are integral with each other, thus reducing the number of components.

For example, when the lower crankcase 26 is provided with a pin that engages with the second engagement end portion 86 of the elastic member 84, the partition wall 26W of the lower crankcase 26 has to be provided with a boss that protrudes toward components such as the drive shaft 48 and the drive shaft gears 49. Therefore, components such as the drive shaft 48 and the drive shaft gears 49 cannot be disposed close to the partition wall 26W. However, according to the present embodiment, no pin has to be press-fitted to the partition wall 26W of the lower crankcase 26, thus allowing components such as the drive shaft 48 and drive shaft gears 49 to be disposed close to the partition wall 26W.

As illustrated in FIG. 5A, in the present embodiment, the shift shaft 74 is located lower than the center 46C of the main shaft 46 and the center 62C of the rotation plate 62. Thus, the shift shaft 74 is disposed at a relatively low position. As a result, when the shift pedal 19 is connected to the shift shaft 74 via the link mechanism 17, the link mechanism 17 is reduced in length.

Second Embodiment

Figure 12:
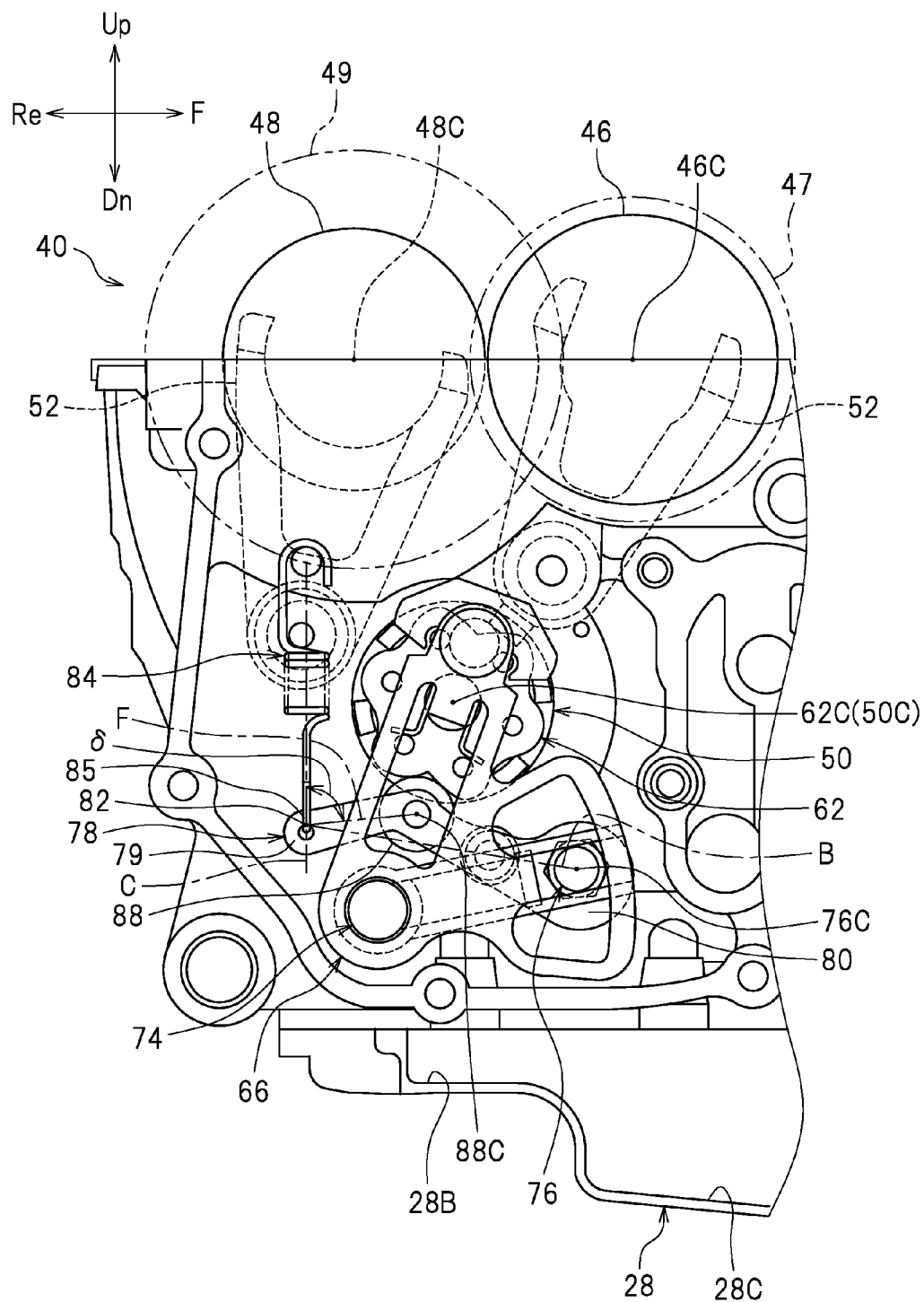
FIG. 12 is a side view illustrating a gear change mechanism according to a second embodiment of the present invention and its surrounding components.

In the first embodiment, the stopper roller 88 is disposed on the second line segment B, and the stopper lever 78 has a linear shape. As illustrated in FIG. 12, in a second embodiment of the present invention, a center 88C of the stopper roller 88 is not disposed on the second line segment B. In the following description, elements similar to those in the first embodiment are identified by the same reference signs as those used in the first embodiment, and description thereof will be omitted.

In the present embodiment, when viewed in the axial direction of the shift shaft 74, the center 88C of the stopper roller 88 is disposed between: the center 62C of the rotation plate 62; and the second line segment B that connects the center 76C of the support shaft 76 to the connection 82 between the first end portion 79 of the stopper lever 78 and the first engagement end portion 85 of the elastic member 84. When viewed in the axial direction of the shift shaft 74, an angle δ formed between the line C that extends along the axis of the elastic member 84 and a line segment F' that connects the center 88C of the stopper roller 88 to the connection 82 is 90 degrees or less.

In the present embodiment, the center 88C of the stopper roller 88 is disposed between the second line segment B and the center 62C of the rotation plate 62. Thus, an angle formed between the line C, which extends along the axis of the elastic member 84, and the second line segment B, which connects the connection 82 to the center 76C of the support shaft 76, is set closer to 90 degrees or set to 90 degrees. Therefore, a force is efficiently applied from the elastic member 84 to the stopper lever 78. In other words, it is unnecessary for the elastic member 84 to apply a large force to the stopper lever 78. As a result, the elastic member 84 is reduced in size and weight.

Third Embodiment

Figure 13:
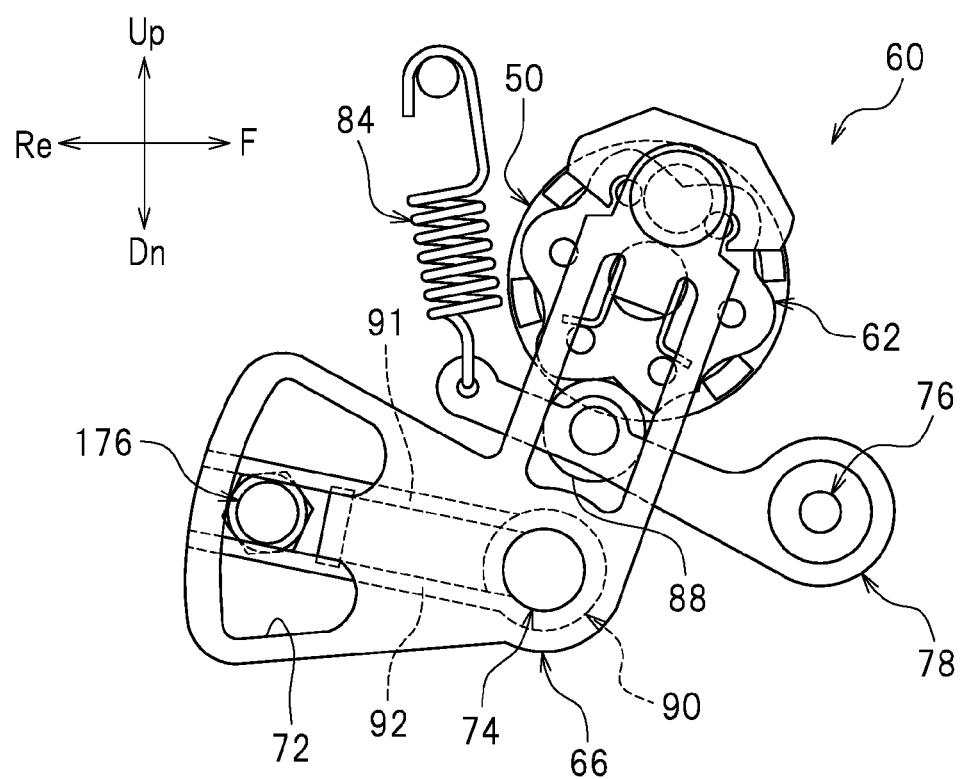
FIG. 13 is a side view illustrating a gear change mechanism according to a third embodiment of the present invention.

In the first embodiment, the opening 72 of the shift lever 66 and the support shaft 76, which supports the stopper lever 78, overlap with each other when viewed in the axial direction of the shift shaft 74. As illustrated in FIG. 13, in a third embodiment of the present invention, the opening 72 and the support shaft 76 do not overlap with each other. In the following description, elements similar to those in the first embodiment are identified by the same reference signs as those used in the first embodiment, and description thereof will be omitted.

In the present embodiment, the gear change mechanism 60 preferably includes: the support shaft 76 that supports the stopper lever 78; and an additional support shaft 176. When viewed in the axial direction of the shift shaft 74, the additional support shaft 176 overlaps the opening 72 of the shift lever 66. The additional support shaft 176 is located rearward relative to the support shaft 76. When viewed in the axial direction of the shift shaft 74, the shift shaft 74 is disposed between the support shaft 76 and the additional support shaft 176. The additional support shaft 176 is located rearward relative to the elastic member 84. The additional support shaft 176 is disposed between the first and second arm portions 91 and 92 of the torsion spring 90. The first and second arm portions 91 and 92 are engageable with the additional support shaft 176. According to the present embodiment, effects similar to those of the above-described first embodiment are achieved.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to embodiments described herein and/or illustrated herein. Hence, the present invention is not limited to the embodiments described herein. The present invention includes any and all embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

The invention claimed is:

1. A power unit, comprising:
  a main shaft having a plurality of first gears including a first movable gear that is movable around an axis of the main shaft;
  a drive shaft having a plurality of second gears including a second movable gear that is movable around an axis of the drive shaft, the second gears being configured to intermesh with the first gears;

a shift fork configured to engage with the first movable gear and the second movable gear;

a shift drum having a groove with which the shift fork engages;

a crankcase housing the main shaft, the drive shaft, the shift fork and the shift drum;

a rotation plate fixed to an end of the shift drum, to thereby rotate with the shift drum, the rotation plate including an outer peripheral surface having a plurality of recessed portions;

a shift lever configured to engage with the rotation plate;

a shift shaft fixed to the shift lever;

a support shaft disposed substantially in parallel with the shift drum;

a stopper lever, including a first end portion and a second end portion that is rotatably supported by the support shaft;

a stopper roller disposed between the first end portion and the second end portion of the stopper lever, and being configured to engage with one of the recessed portions of the rotation plate; and an elastic member including a first engagement end portion that is configured to engage with the first end portion of the stopper lever, and a second engagement end portion that is configured to engage with the crankcase, so as to apply a force to the stopper lever to thereby press the stopper roller against the one recessed portion, wherein the stopper lever is so disposed as to, when viewed in an axial direction of the shift shaft, intersect a first line segment that connects a center of the shift shaft to a center of the rotation plate.

2. The power unit according to claim 1, wherein the elastic member is a tension spring.

3. The power unit according to claim 1, wherein when viewed in the axial direction of the shift shaft with the stopper roller engaging with the one recessed portion of the rotation plate,
the stopper roller is disposed on the first line segment, and
a second line segment, which connects a center of the support shaft to a connection between the first end portion of the stopper lever and the first engagement end portion of the elastic member, is separate from the rotation plate.

4. The power unit according to claim 3, further comprising a torsion spring attached to the shift shaft,
wherein the torsion spring and the stopper lever are deviated from each other in the axial direction of the shift shaft, and
wherein a portion of the shift shaft that is located between the torsion spring and the stopper lever is provided with a stopper that restricts axial movement of the torsion spring.

5. The power unit according to claim 4, wherein the torsion spring includes a first arm portion and a second arm portion adjacent to each other, with the shift shaft interposed therebetween, and
wherein the support shaft is disposed between the first arm portion and the second arm portion of the torsion spring.

6. The power unit according to claim 1, further comprising a torsion spring attached to the shift shaft, the torsion spring including a first arm portion and a second arm portion adjacent to each other, with the shift shaft interposed therebetween,
wherein the shift lever includes a protrusion located between the first arm portion and the second arm portion of the torsion spring and engageable with the first arm portion and the second arm portion of the torsion spring, and
wherein the support shaft is disposed between the first arm portion and the second arm portion of the torsion spring.

7. The power unit according to claim 1, wherein when viewed in the axial direction of the shift shaft, a center of the stopper roller is disposed between the center of the rotation plate and a second line segment that connects a center of the support shaft to a connection between the first end portion of the stopper lever and the first engagement end portion of the elastic member.

8. The power unit according to claim 1, wherein when viewed in the axial direction of the shift shaft, the stopper roller is disposed on a second line segment that connects a center of the support shaft to a connection between the first end portion of the stopper lever and the first engagement end portion of the elastic member.

9. The power unit according to claim 1, wherein when viewed in the axial direction of the shift shaft, an angle formed between a third line segment and a fourth line segment is 90 degrees or less, the third line segment connecting a first point, which is a point of intersection of a first line that extends along an axis of the elastic member and a second line that passes through the center of the shift shaft and a center of the support shaft, to a connection between the first end portion of the stopper lever and the first engagement end portion of the elastic member, the fourth line segment connecting the first point to the center of the support shaft.

10. The power unit according to claim 1, wherein when viewed in the axial direction of the shift shaft, an angle formed between a fifth line segment and the first line segment is equal to or smaller than an angle formed between the first line segment and a second line that passes through the center of the shift shaft and a center of the support shaft, the fifth line segment connecting the center of the shift shaft to a connection between the first end portion of the stopper lever and the first engagement end portion of the elastic member.

11. The power unit according to claim 1, wherein when viewed in the axial direction of the shift shaft, a distance between the center of the shift shaft and a connection between the first end portion of the stopper lever and the first engagement end portion of the elastic member is shorter than a distance between the center of the shift shaft and the center of the rotation plate.

12. The power unit according to claim 1, wherein the crankcase includes:
a wall located between the main shaft and the elastic member and between the drive shaft and the elastic member, and
a boss that extends from the wall in a direction substantially perpendicular to an axial direction of the elastic member and with which the second engagement end portion of the elastic member engages, wherein the wall and the boss are cast in one piece.

13. The power unit according to claim 12,
wherein when viewed in an axial direction of the main shaft, the boss is disposed to overlap the main shaft, the first gears, the drive shaft, or the second gears.

14. The power unit according to claim 1,
wherein the center of the rotation plate is located lower than a center of the main shaft and a center of the drive shaft, and
wherein the center of the shift shaft is located lower than the center of the rotation plate.

15. A straddle-type vehicle, comprising the power unit according to claim 1.

* * * * *